US005300727A

United States Patent [19]

Osuga et al.

[11] Patent Number: 5,300,727

[45] Date of Patent: Apr. 5, 1994

[54] ELECTRICAL MUSICAL INSTRUMENT HAVING A TONE COLOR SEARCHING FUNCTION

[75] Inventors: Ichiro Osuga; Masahiro Shimizu, both of Hamamatsu, Japan

[73] Assignee: Yamaha Corporation, Hamamatsu, Japan

[21] Appl. No.: 926,337

[22] Filed: Aug. 6, 1992

[30] Foreign Application Priority Data

Aug. 7, 1991 [JP] Japan .................................. 3-198108

[51] Int. Cl.$^5$ ......................... G09B 15/04; G10H 1/06

[52] U.S. Cl. .................................... 84/622; 84/477 R; 84/DIG. 6

[58] Field of Search .................................. 84/622–625, 84/477 R, DIG. 6

[56] References Cited

U.S. PATENT DOCUMENTS 4,862,783 9/1989 Suzuki .................................. 84/622

5,160,798 11/1992 Morikawa et al. ............... 84/622 X

*Primary Examiner*—Stanley J. Witkowski

*Attorney, Agent, or Firm*—Graham & James

[57] ABSTRACT

An electronic musical instrument having a searching function of a tone color is provide with a parameter degree memory and a mouse or the like for designating any desired range of a specified parameter degree. When the searching is executed, the tone color whose parameter's degree is included within the designated range of the specified parameter is found out.

11 Claims, 12 Drawing Sheets (MIDDLE OF THE VOICE SEARCH PROCESSING ROUTINE)

(MIDDLE OF THE VOICE SEARCH PROCESSING ROUTINE)

SEARCH EXECUTION ROUTINE

ELECTRICAL MUSICAL INSTRUMENT HAVING A TONE COLOR SEARCHING FUNCTION

BACKGROUND OF THE INVENTION

1. Field of the Invention

The present invention relates to an improvement of a method of searching a desired tone color from a plurality of tone colors in an electronic musical instrument which is capable of reproducing one or more tone colors from among tone colors of a plurality of kinds.

2. Description of the Prior Art

Among electronic musical instruments presently in practical use, there are many electronic musical instruments which are capable of reproducing not less than one hundred tones colors (voices) . Each voice is provided with a title referred to as a voice number and a voice name, and every performer can designate a desired voice by searching a voice list by the number or the name of the voice through inputting the number or the name from a ten-key board or the like.

However, in the case where the number of voices exceed one hundred, there have been such problems that all the numbers or names cannot be stored and much time is consumed in searching the list. Furthermore, when the desired voice name is found in a list or the like, it has been impossible to perceive what sort of tone color the voice has unless it is reproduced.

In order to give solution to the above-mentioned problems, there has been proposed a system in which a plurality of voice patterns are classified in hierarchies by the features of the voices, and a desired tone color is found out by searching the hierarchy from a higher level to a lower level, for example, from wind instruments to woodwind instruments, further to a saxophone (lowest level). However, when many tone colors are found out at the lowest level in the searching, there is no other manners for distinguish each of the lowest objects (voices), therefore, resulting in that only actual tone generation of all the lowest objects can be possible to distinguish each of the voices.

Otherwise, there can be a method of making the desired voice searchable by prestoring character string data (of such as a clear tone) for each voice and searching the character string data. However, the method has a drawback that it is not capable of a search operation limiting the degree of a feature of each voice. In concrete, there has been a drawback that a "more clear sound" is fatally classified into the same category as that of a "less clear sound".

SUMMARY OF THE INVENTION

Accordingly, it is an object of the present invention to provide an electronic musical instrument capable of rapidly searching a desired voice by giving to each voice a data representing the degree of a feature of the voice and searching the same according to a range of the degree of the feature.

In accordance with the present invention, an electronic musical instrument having a searching function of a tone color comprises tone color data storage means for storing a plurality of tone color data each of which has a plurality of parameters, parameter degree storage means for storing a degree of a specified parameter for each tone color, parameter degree designation means for designating a range of a degree of the specified parameter, search means for searching a tone color data, from the tone color data storage means, the specified parameter of which has a degree that is included in the range designated by the parameter degree designation means, and musical tone generation means for generating a musical tone according to the searched tone color.

When the searching is executed, the tone color whose parameter's degree is included within the designated range of the specified parameter is found out. The range can be represented by the values, such as from 0.0 to 10.0.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Figure 1:
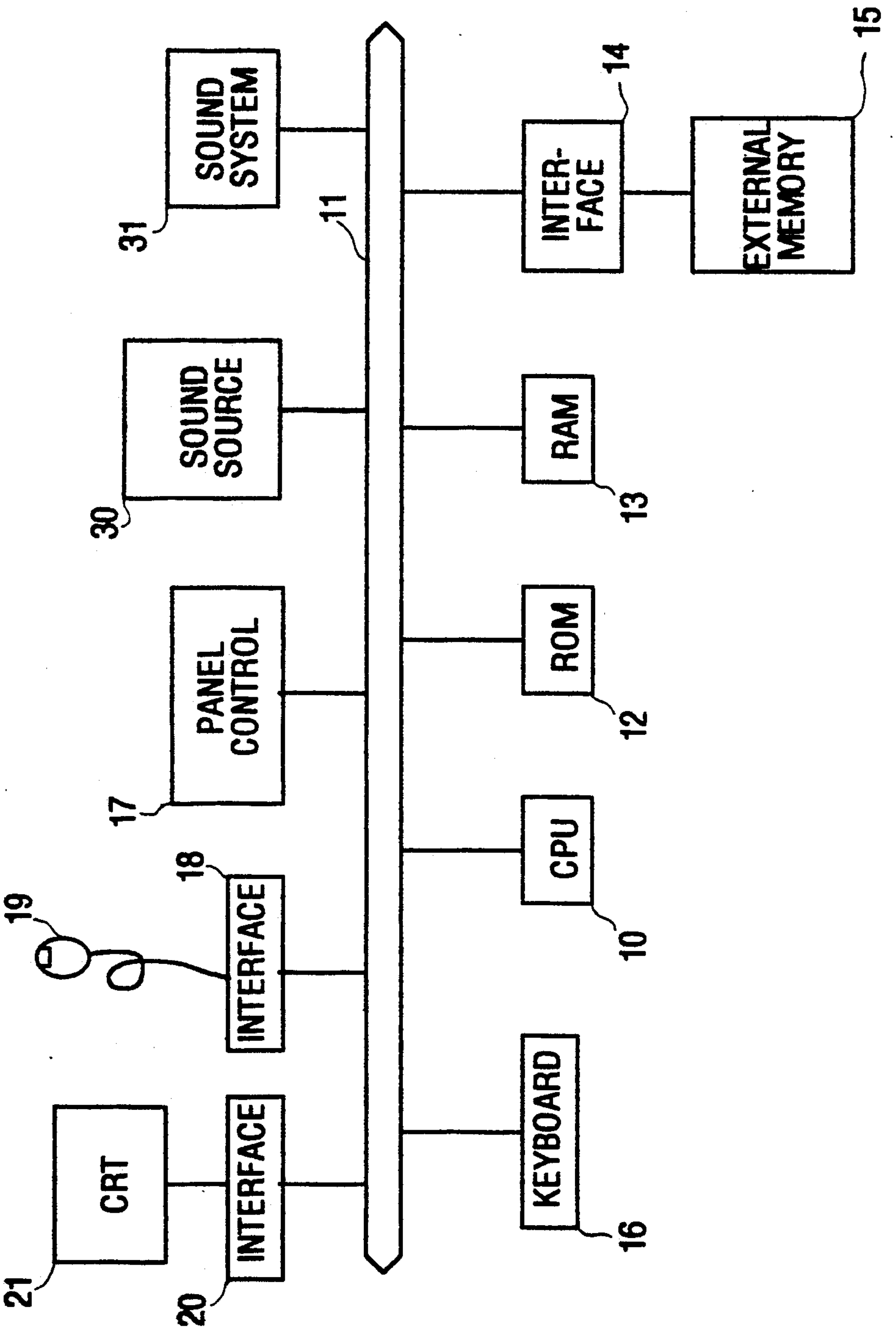
FIG. 1 is a view of a block diagram of an electronic musical instrument in accordance with an embodiment of the present invention.

FIG. 1 is a block diagram of an electronic musical instrument in accordance with an embodiment of the present invention. The electronic musical instrument is controlled by a CPU and performed by means of a keyboard 16. Voice data are stored in a ROM, a RAM and an external memory unit. The voice data stored in the RAM is editable. The CPU 10 is connected via a bus 11 to the ROM 12, the RAM 13, interface units 14, 18, and 20, the keyboard 16, a panel control 17, and a sound source 30. The ROM 12 stores preset tone data, a control program, and other data. The RAM 13 includes a variety of register segments and stores editable voice data. The region in the RAM 13 where the voice data is stored is so constructed that the voice data is maintained by a backup power source even when the main power of the electronic musical instrument is off. The interface 14 is connected to an external memory 15. The external memory 15 can be constructed of, for example, a floppy disk or a memory card. When the external memory 15 is constructed of a floppy disk or a RAM memory card, voice data stored there is editable. The keyboard 16 is an ordinary keyboard having a compass of approximately five octaves. The panel control 17 includes a ten-key pad 35, function keys 36, mode keys 37, and cursor keys 38. The interface 18 is connected to a mouse 19. The mouse 19 is used for designating parameters and other purpose by moving a cursor displayed on a CRT display 21. The interface 20 is connected to the CRT display 21. The CRT display 21 displays parameters of a designated voice and so forth. The sound source 30 is a waveform memory type source having approximately sixteen tone generation channels to generate a musical tone signal according to musical performance data inputted from the CPU 10. Parameters (tone color data in the voice data (see FIG. 2)) for forming a musical tone signal are previously given from the CPU 10. The sound source 30 is connected to a sound system 31. The musical tone signal reproduced by the sound source 30 is inputted into the sound system 31, and after being amplified in an amplifier, being outputted from a loudspeaker or the like device.

Figure 2:
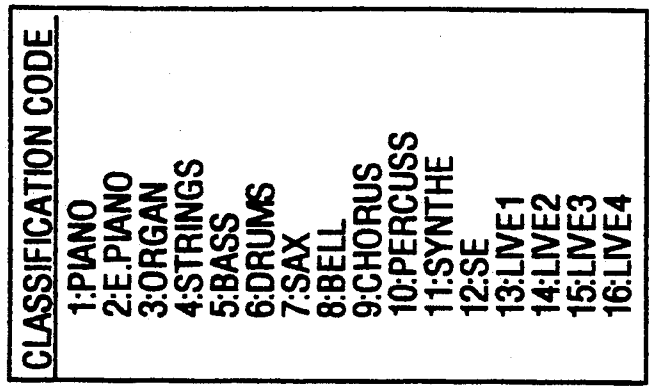
FIGS. 2(A) and 2(B) are a conceptual view of the construction of a voice memory of the electronic musical instrument shown in FIG. 1.
Figure 2:
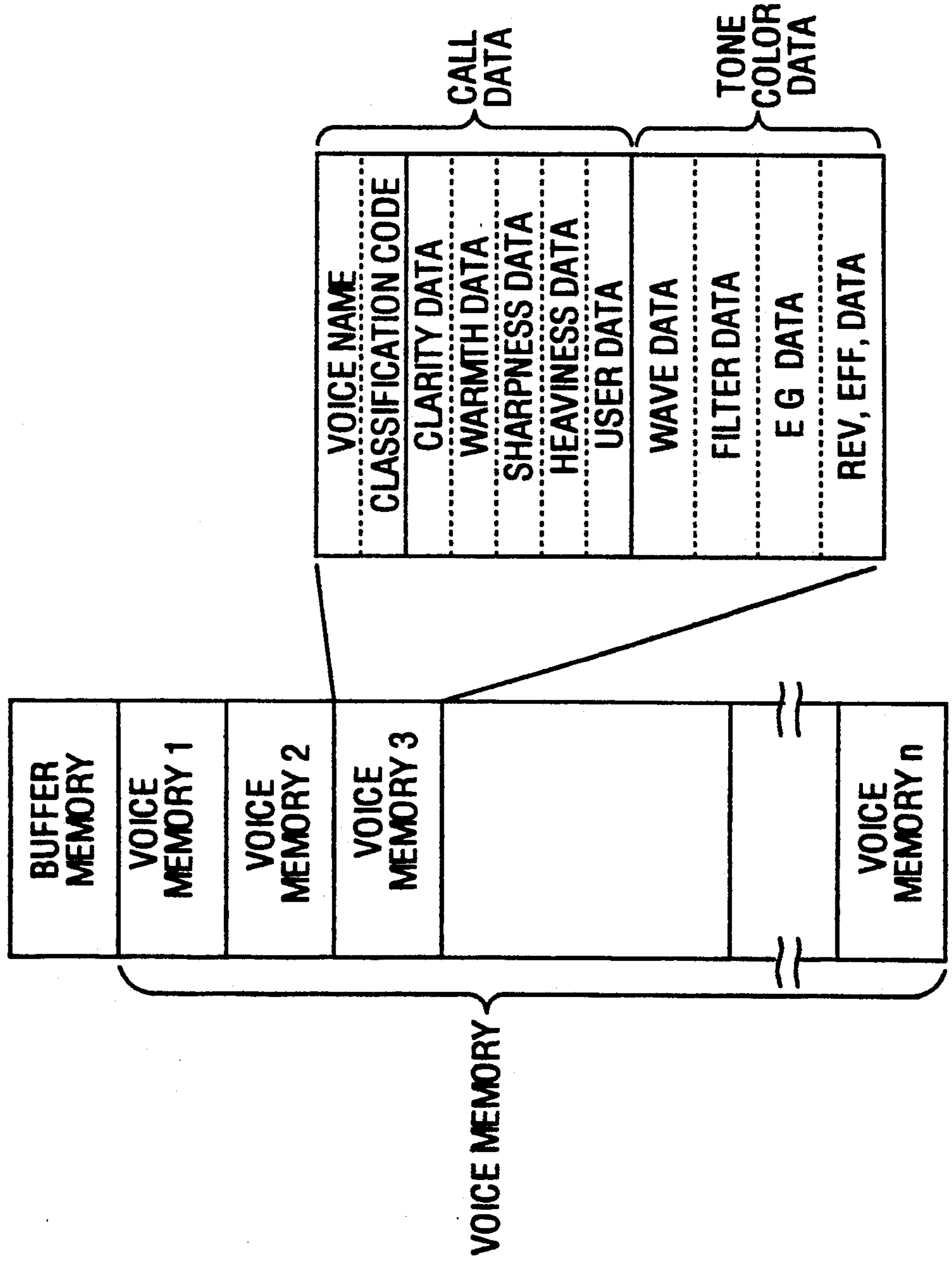

FIG. 2(A) shows the construction of a voice memory provided, for example, in the aforementioned RAM 13. In the ROM 12, the RAM 13, and the external memory 15, n units of voice data are stored in respective predetermined areas. Each voice data is composed of a voice name, a classification code, call data, and tone color data. In the classification code, n units of voices are classified by their approximate tone colors (corresponding to similar acoustic musical instruments) as shown in FIG. 2 (B). The call data represents the degrees of five tone factors: clarity data, warmth data, sharpness data, heaviness data, and user data. The above-mentioned tone factors of the call data are each fanned by coding a musical sound character given by each tone color data according to an impression the tone color gives out, and the call data can be edited by an user as described hereinafter. The tone color data is composed of waveform data, filter data, EG data, and such effect data as reverb data. The sound source 30 forms a musical tone signal based on the data. In the RAM 13, a buffer memory is provided other than the voice memory. The buffer memory has the same construction as one voice memory. Voice data designated at the mode of reproducing a sound or editing is copied from the voice memory to the buffer memory. Namely, the data in the buffer memory is transmitted to the sound source 30. In the editing mode, the data stored in the buffer memory is rewritten and then copied again to the voice memory.

Figure 3:
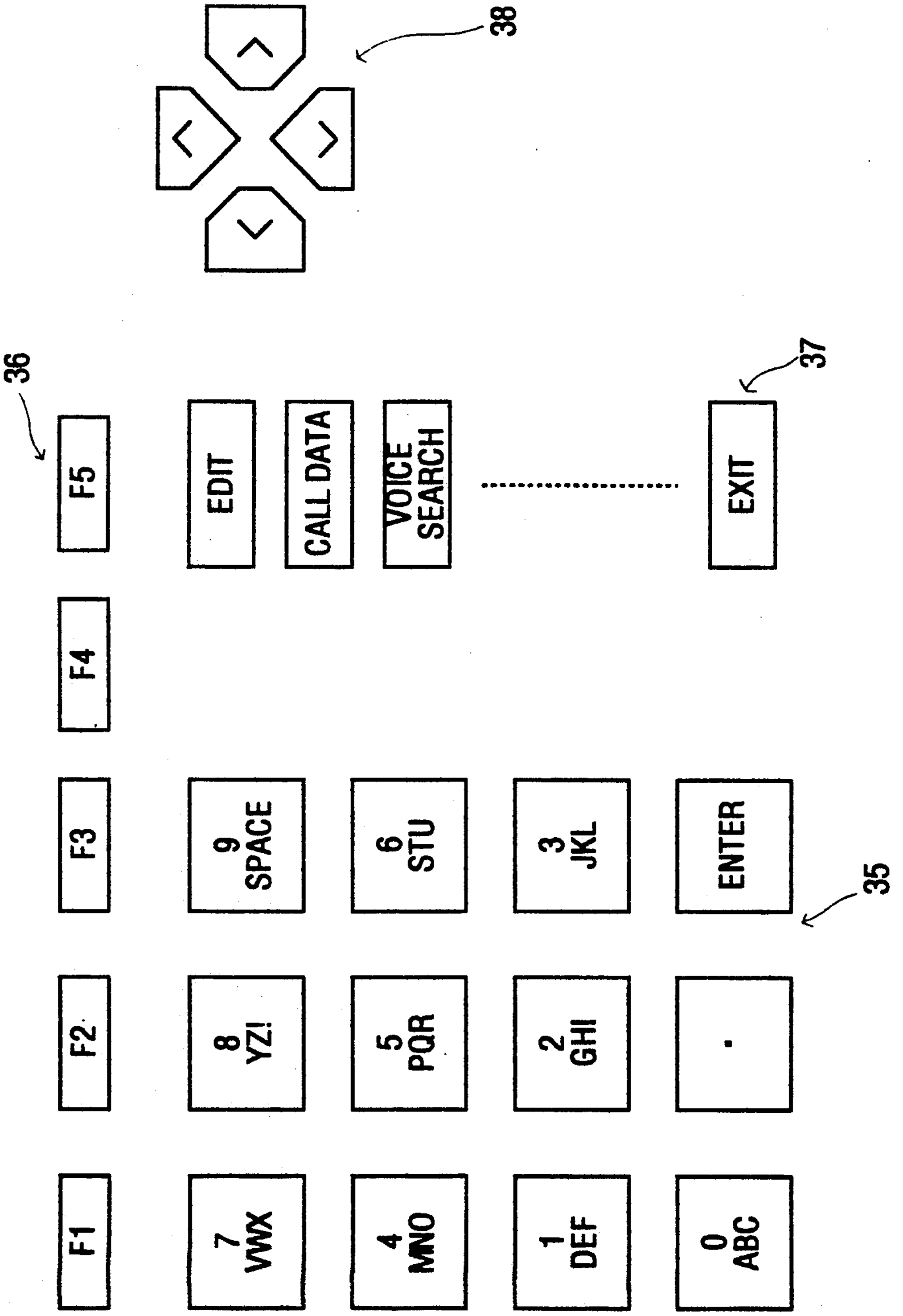
FIG. 3 is a schematic view of an operation panel of the electronic musical instrument shown in FIG. 1.

FIG. 3 shows a schematic view of a panel control key arrangement. The ten-key pad 35 concurrently serves as an alphabet key pad to be used for voice number designation and character string data input. The function keys 36 are provided below the CRT display to be used for selecting between function signs displayed at a lower position of the CRT display 21 as shown in FIGS. 4 through 7. The mode keys 37 are for designating a variety of modes such as an edit mode, a call data setting mode, and a voice search mode. The cursor keys 38 are for moving the cursor displayed on the CRT display 21.

The following describes the operation of the present electronic musical instrument with reference to CRT display screen examples shown in FIGS. 4 through 7 and flowcharts shown in FIGS. 8 through 12.

Figure 8:
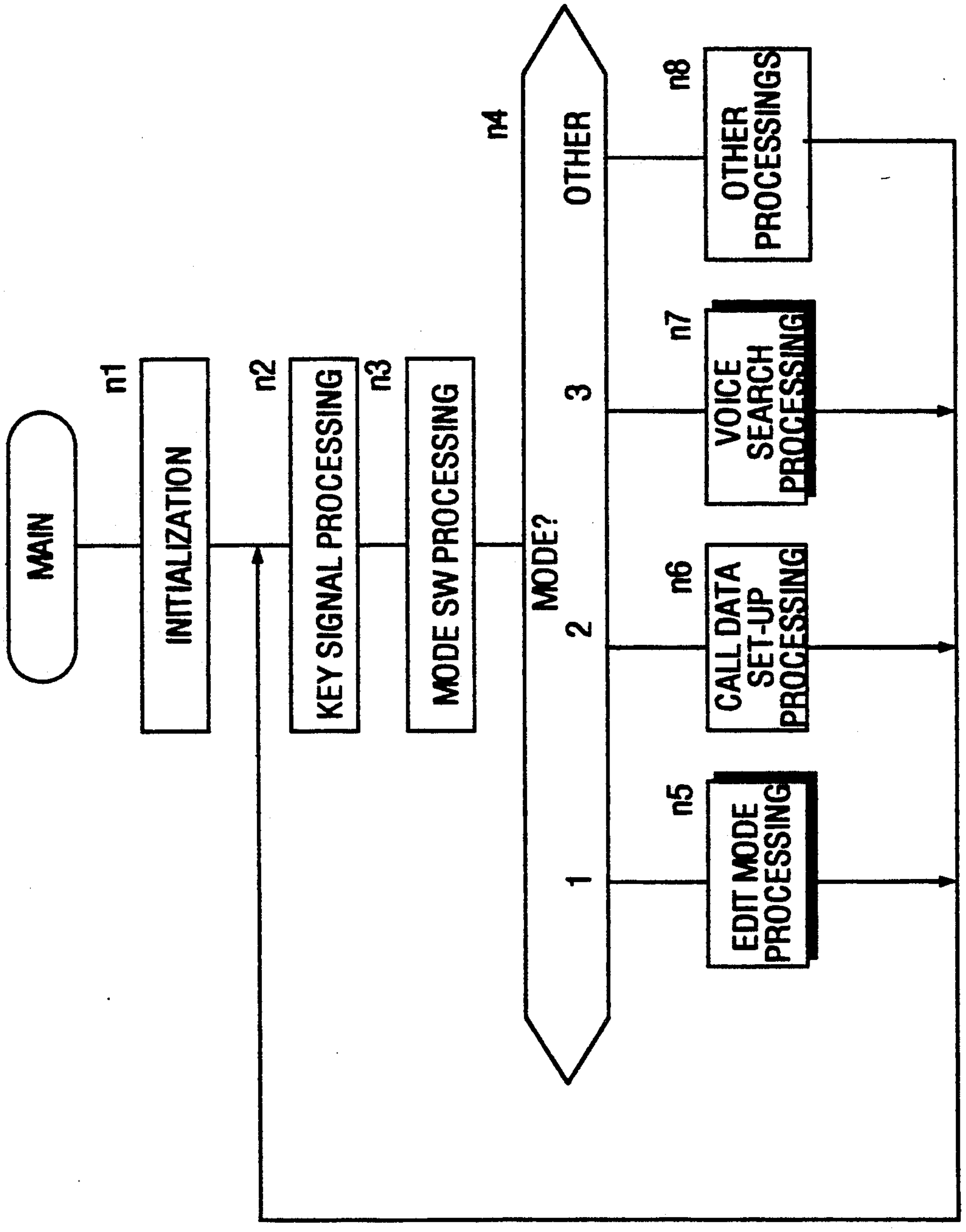
FIG. 8 is a flowchart of an operation of the electronic musical instrument shown in FIG. 1.

FIG. 8 is a flow chart of a main routine.

Simultaneously with turning on the electronic musical instrument, an initial setting operation (n1) is executed. The initial setting operation is for resetting the register segments, reading a prescribed voice data to write the same into the buffer memory in the RAM 13, and so forth. After the initializing operation, a depressed key signal processing operation (n2) is executed in response to turning on and off any key of the keyboard 16, and then a mode key processing is executed in response to turning on any one of the mode keys 37 of the panel control 17 (n3). The above-mentioned operation is such that a voice data written in the buffer memory is displayed on the CRT display 21 according to a format corresponding to the selected mode.

Then processing operations such as edit mode processing (n5), call data setting (n6), voice searching (n7) are executed to return to the depressed key signal processing operation (n2), and the following processing operations are repeated.

Figure 4:
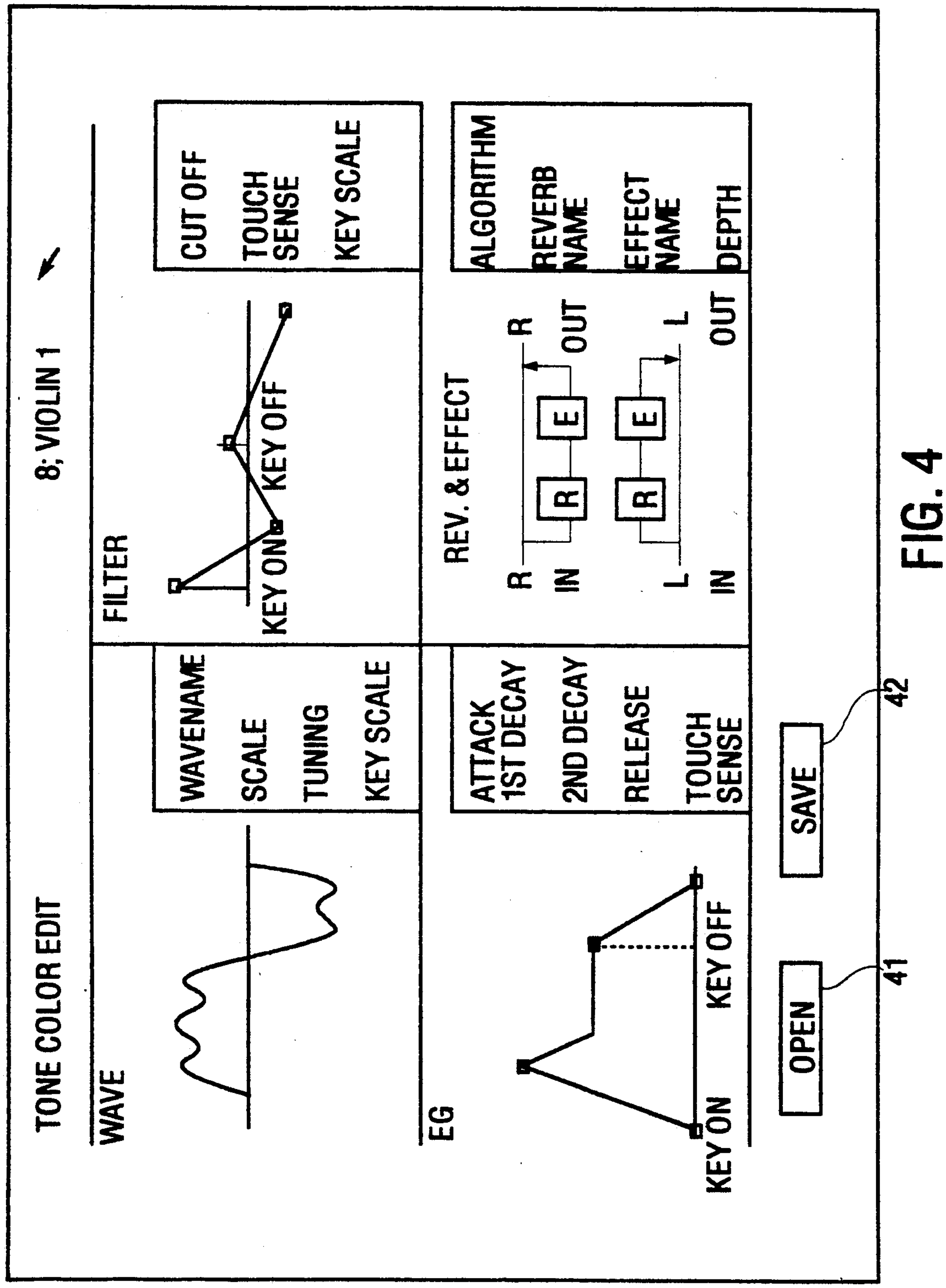
FIG. 4 is a view of an exemplified screen display of the electronic musical instrument shown in FIG. 1.
Figure 5:
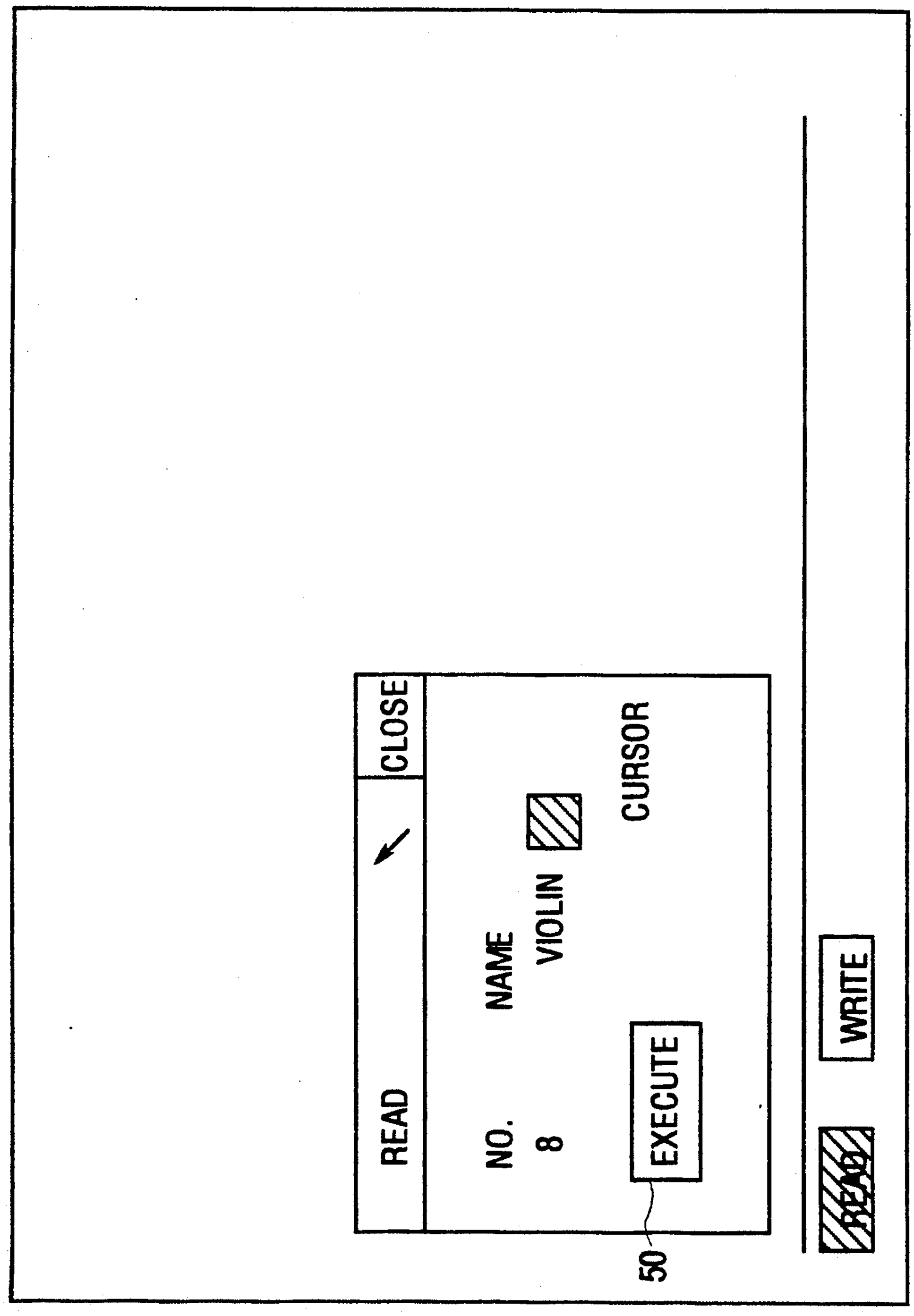
FIG. 5 is a view of an exemplified screen display of the electronic musical instrument shown in FIG. 1.
Figure 9:
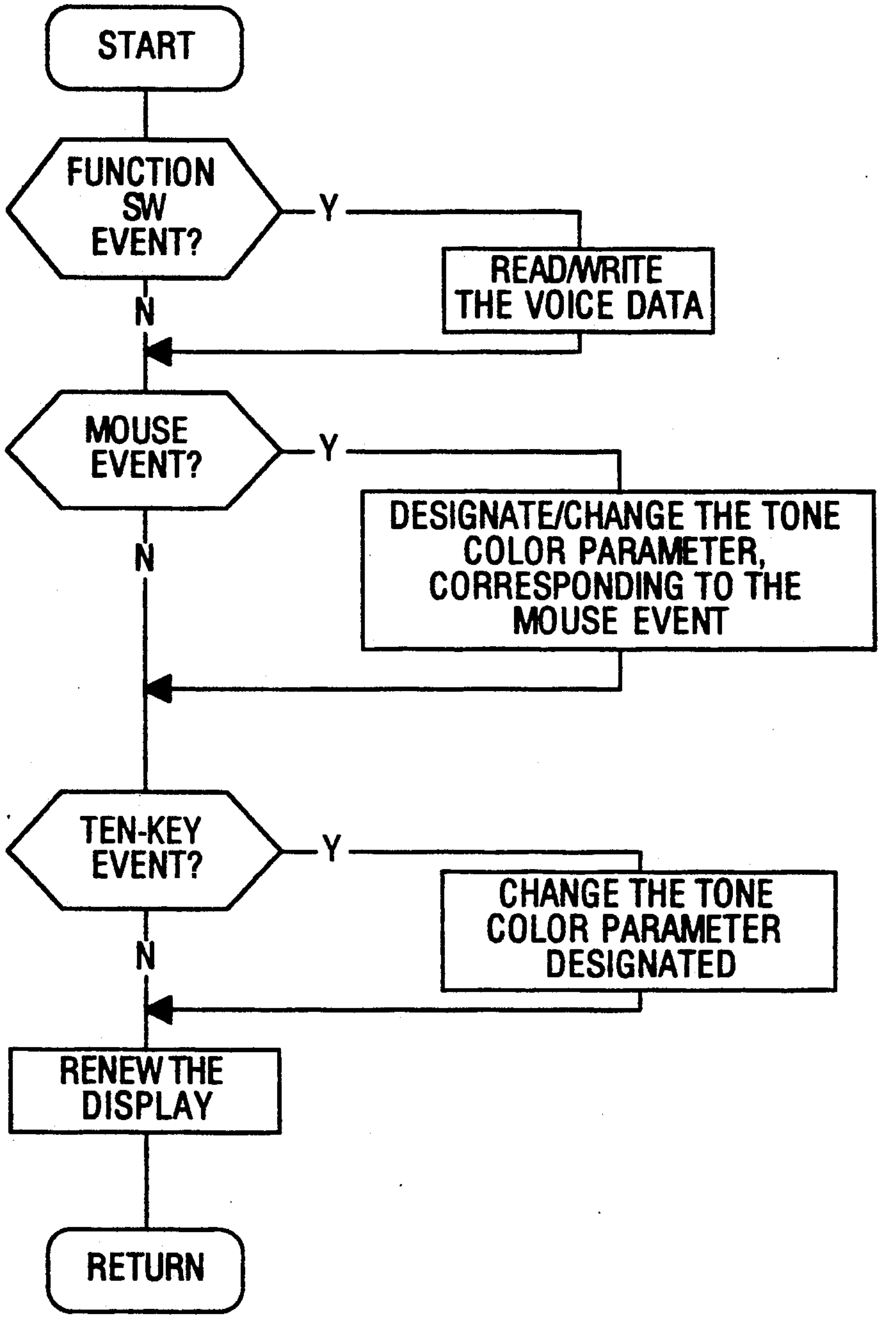
FIG. 9 is a flowchart of an operation of the electronic musical instrument shown in FIG. 1.

FIG. 9 is a flowchart of a processing routine in the edit mode (n5). The present routine operation is effected when the edit key of the mode keys 37 is turned on and the edit mode is selected (MODE =1), and a variety of parameters of a designated voice data are renewed. In the edit mode, a menu screen as shown in FIG. 4 is displayed on the CRT display 21. In the present operation, it is judged whether the function keys F1 and F2 (corresponding respectively to a read function 41 and a write function 42 shown at a lower position in FIG. 4) are on event (n1O), and it is judged whether the mouse is on event (n11) or the ten-key pad is on event (n12). When any one is on event, the corresponding operation is executed. When a function key is on event, a processing operation corresponding to the function key function on display, i.e., reading (Fl) and writing (F2) operation of a voice data is effected between the voice memory and the buffer memory (n13). In the above place, the reading operation is to read a voice data from the voice memory to the buffer memory. When a command of reading a voice data is issued, a window for reading the voice data appears on the CRT display 21 as shown in FIG. 5. When the user moves the cursor to the voice number and input a voice number by means of the ten-key pad, a voice data is designated. By moving the cursor to the execute sign and click the same, the designated voice data is read to the buffer memory. The writing operation is to write the voice data edited in the buffer memory into an area of the voice memory. The mouse event is to move the cursor to a desired location on the screen in the same manner as in an ordinary personal computer and click the key of the mouse. When the above-mentioned operation is effected, the cursor is moved according to the operation to select or change the value of the parameter located at the clicked position (n14). In the case where an EG parameter or a filter characteristic parameter as shown in FIG. 4 is to be changed, by moving a square mark displayed at each peak, the entire waveform and the characteristic can be changed. When the ten-key pad is on event, the instantaneous value of the designated parameter is changed (n15). After carrying out the above-mentioned operations, the screen display is renewed according to the operation performed (n16) to return to the main routine.

Figure 6:
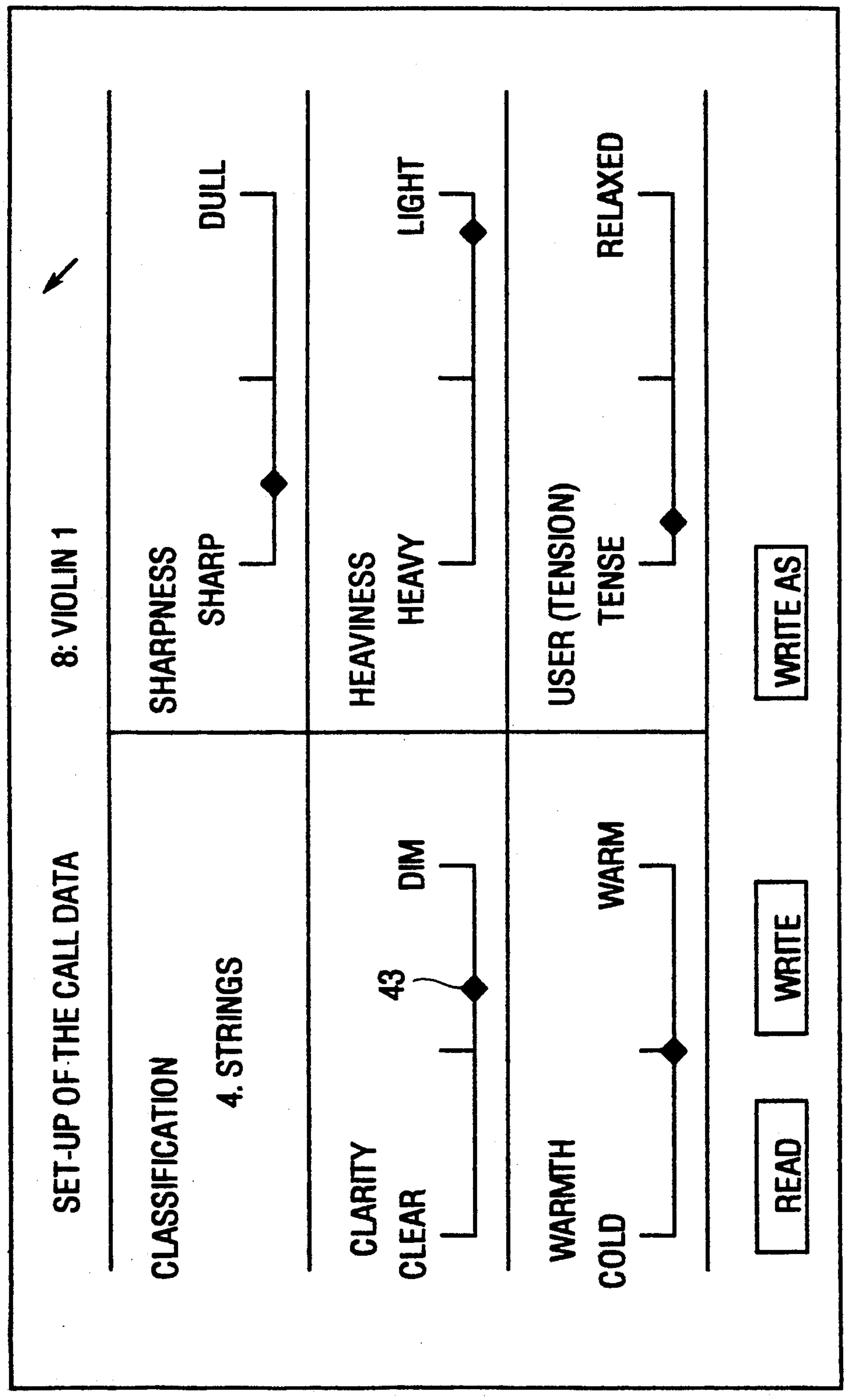
FIG. 6 is a view of an exemplified screen display of the electronic musical instrument shown in FIG. 1.

The call data processing routine executed at step n6 of the flowchart in FIG. 8 has substantially the same processing routine according to the flowchart in FIG. 9. In the call data setting routine, a screen as shown in FIG. 6 is displayed. The present screen displays the contents of the call data representing the features of the voice data stored in the buffer memory at the time. The degrees of such features as clarity and warmth are each indicated by a pointer 43. Each pointer can be moved by manipulating the mouse, with which operation the values of the clarity data, warmth data, sharpness data, heaviness data, and user data can be arbitrarily changed. It is noted that the user data shown at a lower right position on the screen is the data arbitrarily named by each performer, and in the case in FIG. 6, the degree of tightness is set up.

It is noted that several names of the user data are prestored, and upon turning on the function key (F4) having a name writing function, such menus as tightness, duration, and thickness are displayed on the screen. Each user selects a desired one from the menus.

Figure 7:
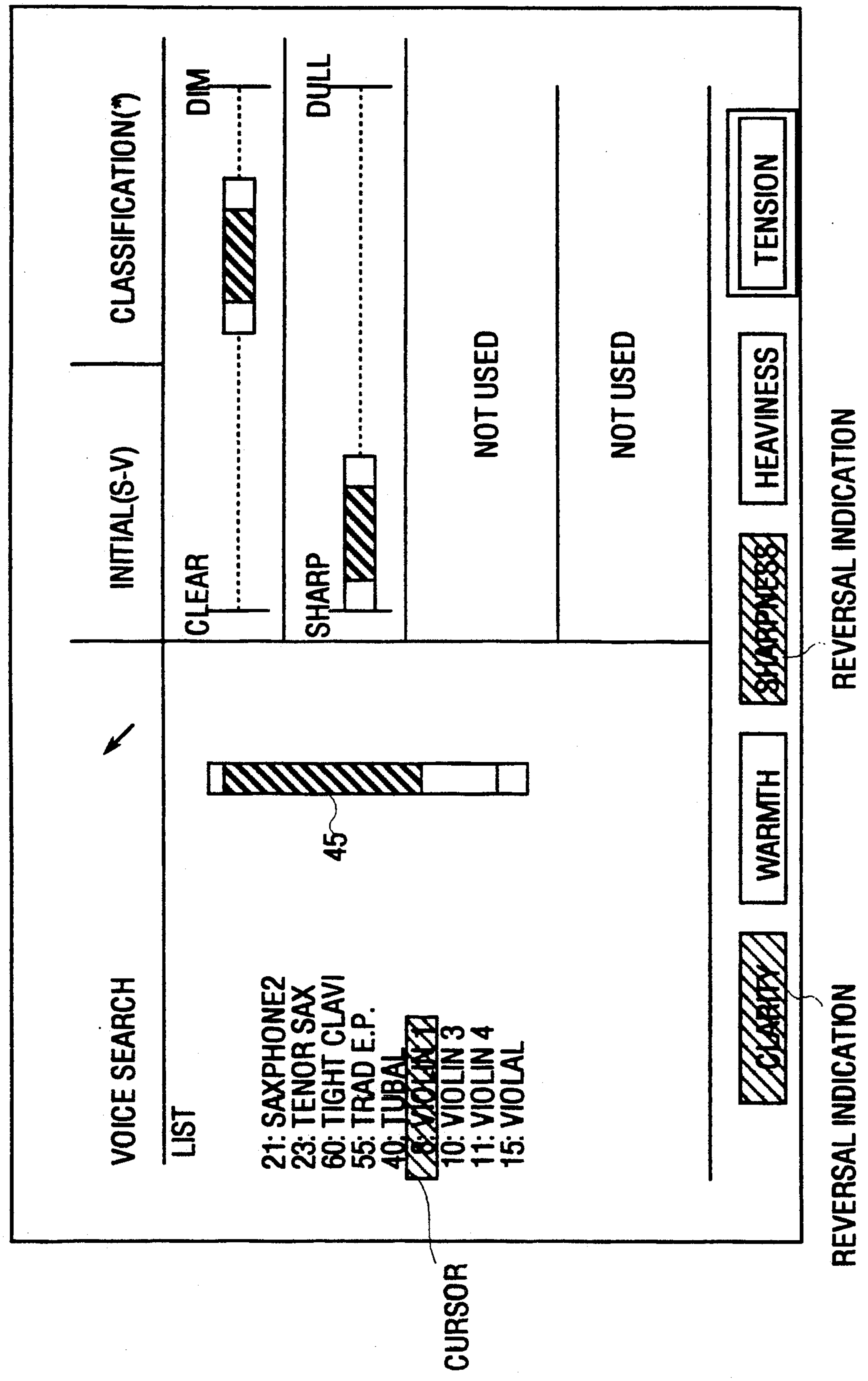
FIG. 7 is a view of an exemplified screen display of the electronic musical instrument shown in FIG. 1.
Figure 10:
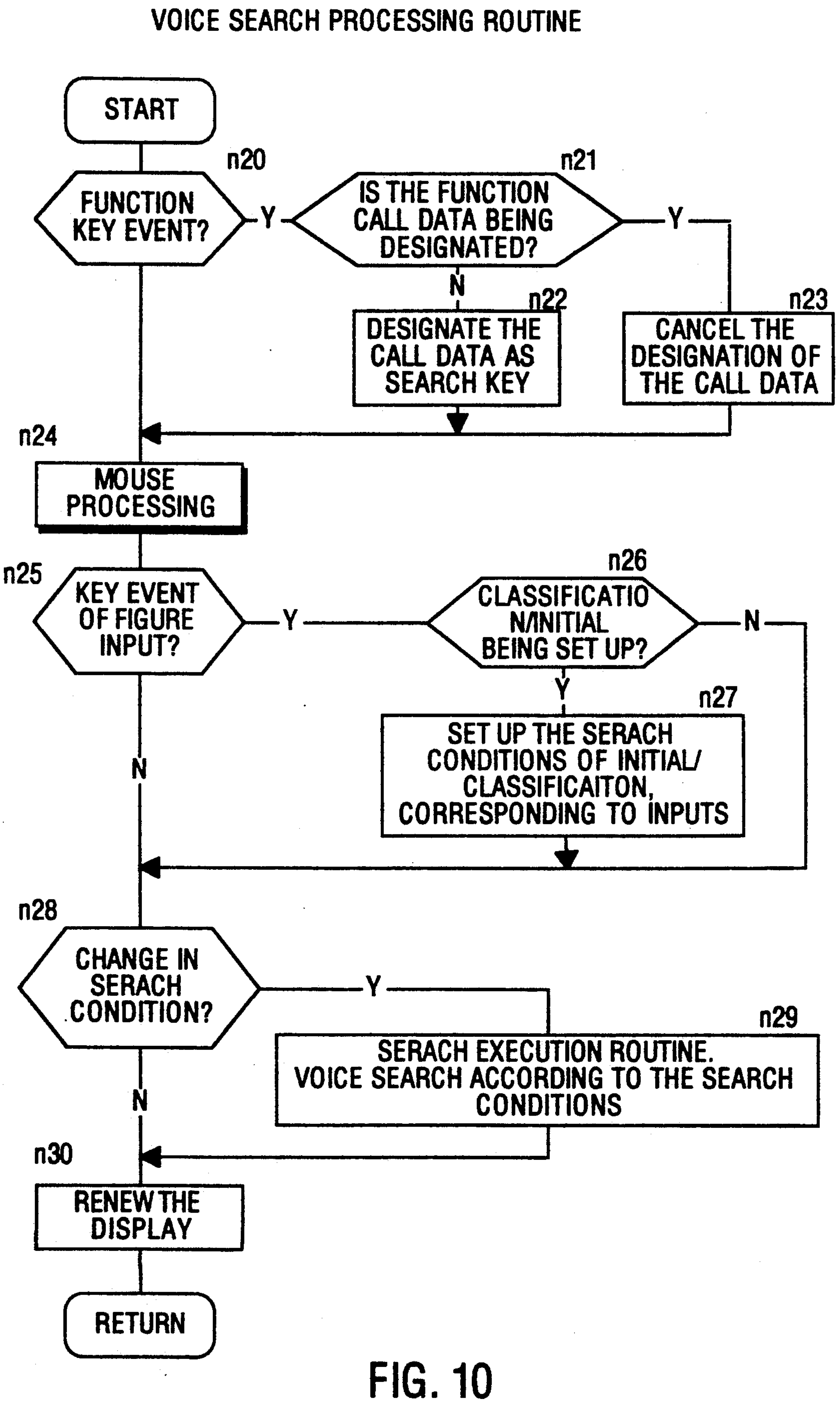
FIG. 10 is a flowchart of an operation of the electronic musical instrument shown in FIG. 1.

FIG. 10 is a flowchart of a voice search routine. This operation is to search a desired voice making the call data serve as a key. In the present mode, a menu screen as shown in FIG. 7 is displayed. At a lower position on the CRT display 21 are displayed five kinds of call data. The call data correspond to Fl through F5 of the function keys 36. When one of the function keys is depressed, the corresponding call data is selected as a key, and when the function key is depressed again, the selection is canceled. The selected call data is reversed on the screen (clarity sign and sharpness sign are reversed in FIG. 7) . When a function key is turned on (n2O), it is judged whether the corresponding call data is currently selected (n21). when the corresponding call data is not selected, the call data is selected as a key to search the voice data (n22). The present operation includes reversing the sign corresponding to the function key on the screen and displaying a scale representing the degree of the feature of the call data at a right position on the screen. When the call data corresponding to the depressed function key is already selected, the selecting operation of the corresponding call data is canceled and the corresponding menu screen disappears (n23). Subsequently, in response to a mouse operation, search condition setting and voice selection from the list are executed (n24). In the search condition setting, the designation range of the degree of each feature of the call data displayed at a right position on the screen is to be extended, contracted, or laterally shifted by moving the square marks at both ends of the range. On the other hand, voice names obtained through the search operation at step n29 are displayed at a right position on the screen. Selection of a desired voice data can be performed by designating one of the data by means of the mouse. The selected voice data is read to the buffer memory to be the current tone data to be subject for musical performance according to depressing the keys of the keyboard. It is noted that the mouse signal processing operation at step n24 includes processing for normal cursor movement.

When a key of the ten-key pad is depressed, the cursor is moved in advance to a first letter setting section or a classification condition setting section (upper right positions on the screen), and it is judged whether the current state is in first letter setting or classification condition setting operation (n26) . When either of the above-mentioned operation is running, a condition setting for the first letter setting section or the classification condition setting section is effected according to the input key (n27). In another state, any event of the ten- key pad is ignored. Voice search is effected within the range of the setup first letter and the range of classification.

Subsequent to the above-mentioned operations, it is judged whether a change of search condition has taken place (n28). When a change of search condition has taken place, a voice search routine automatically starts (n29). It is noted that, in the search operation, the function of condition change and the function of search execution may be independently effected with provision of another key such as a search execution key. After completing the above-mentioned operations, the menu screen on the CRT display 21 is renewed (n3O) to return to the main routine.

Figure 11:
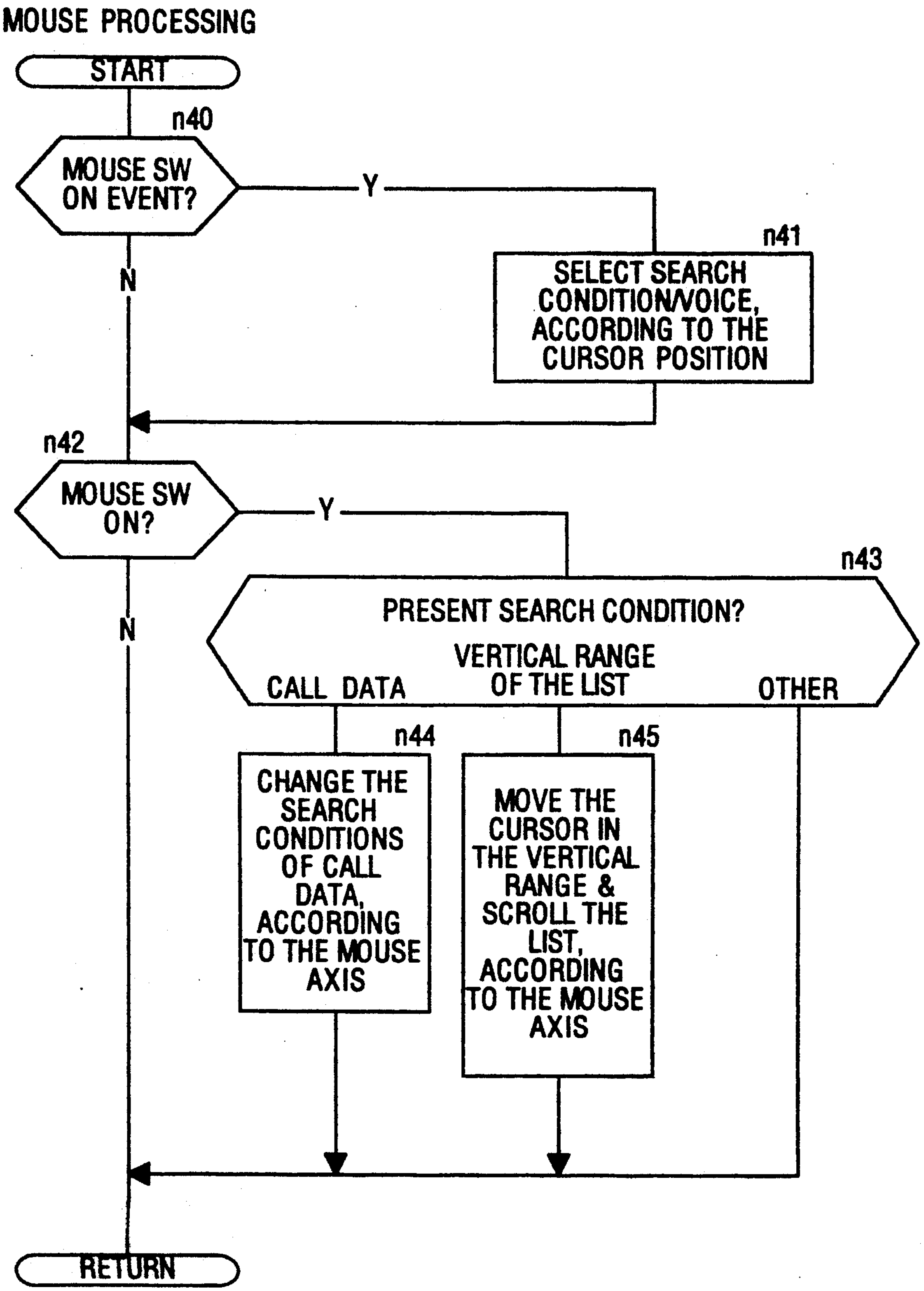
FIG. 11 is a flowchart of an operation of the electronic musical instrument shown in FIG. 1.

FIG. 11 shows a mouse signal processing routine to be executed at step n24. The present routine operation is to control key depressing events of the mouse. When the mouse key is turned on, selection of the function or voice at the instantaneous cursor position is effected (n41). In more detail, when the cursor is at the first letter setting section or the classification condition setting section (upper right positions in FIG. 7) at the time the mouse key is depressed, a first letter or a classification condition can be inputted from the ten-key pad. When the cursor is located at a call data condition, the call data condition is made changeable. When the cursor is located at an indicator bar 45 of a scroll 1 at the right of the voice list, the screen can be scrolled in accordance with a movement of the cursor.

When the mouse is moved with the mouse key depressed, a search operation is effected according to the search condition currently set up (n42, and n43). When a range is set up for the call data condition, the current search condition of the call data is changed according to the coordinates of the mouse (n44). When the cursor is located at either end (the square mark in FIG. 7) of the range of each condition, the range of each condition is extended or contracted according to the movement of the cursor. When the cursor is located at a center position of the range of each condition, the range of each condition is shifted in the same length according to a movement of the cursor. When the cursor is located at the voice list at a left position on the screen, the cursor can be moved to a desired voice data according to the coordinates of the mouse, and the voice data can be copied from the voice memory to the buffer memory. When the cursor is located at the indicator bar 45, the current screen can be scrolled according to a movement of the cursor (n45). After completing the above-mentioned operations, the present routine returns to the voice search routine of the flowchart in FIG. 10.

Figure 12:
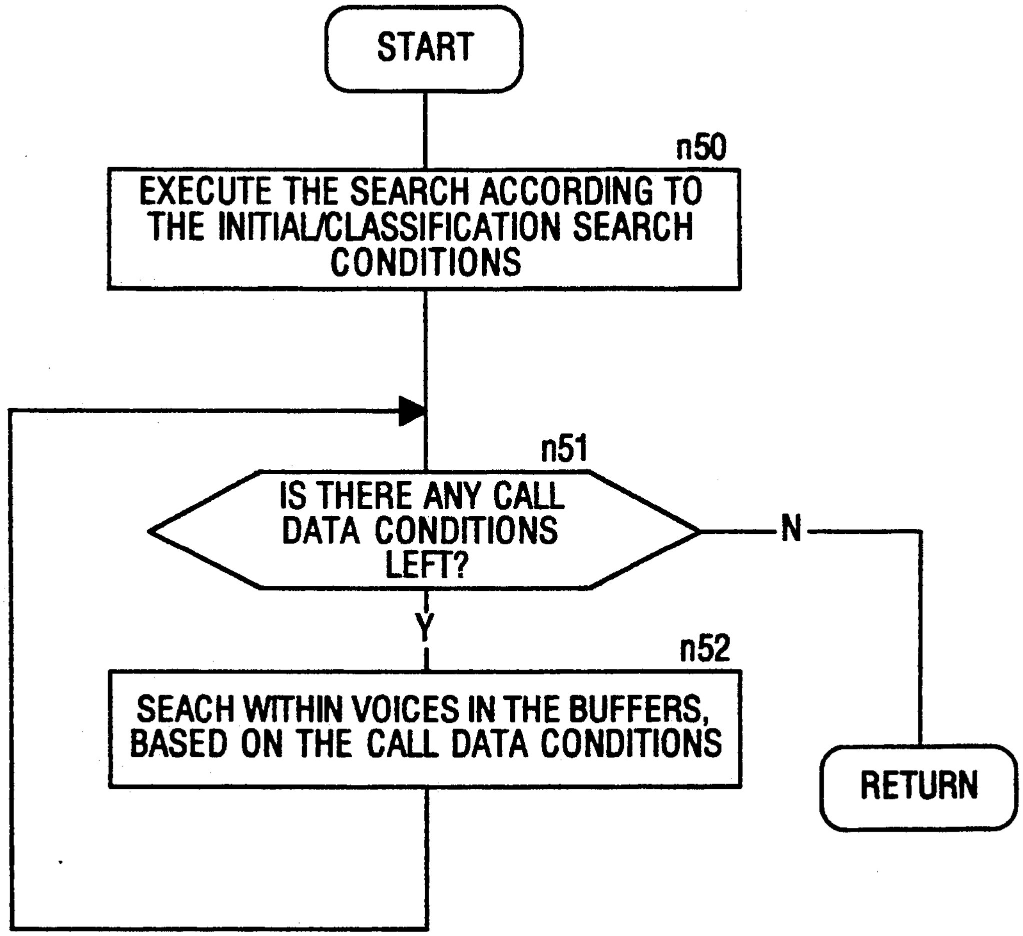
FIG. 12 is a flowchart of an operation of the electronic musical instrument shown in FIG. 1.

FIG. 12 is a flowchart of the voice search routine. From among all the voice data stored in the voice memory, an eligible voice data is searched by the designated first letter and the classification condition and then stored in the list buffer memory (n50). Then it is judged whether there is any unprocessed call condition of the call data (n51). When an unprocessed call condition exists, the voice data in the list buffer is subject to search according to one call data condition (n52) to return to step n51 to discriminate whether there is another unprocessed call condition. In the above-mentioned manner, the voice data are subject to search repetitively in regard of all the setup call conditions (displayed at the right position in FIG. 7) to confirm whether each voice data satisfies each call condition. Only the voice data satisfying all the call conditions are stored again into the list buffer memory. When no unprocessed call condition remains, the present routine returns to the voice search routine of the flowchart in FIG. 10.

For example, a search routine operation is carried out in a condition as shown in FIG. 7, firstly voice data whose first letter are S, T, U, or V are searched from among all the voice data, and then the eligible voice data are subject successively to a search by the range of clarity (4.8 to 7.5) and then to a search by the range of sharpness (0.0 to 4.5) for selection to be then stored into the list buffer memory.

In the above-mentioned case, the graph containing the ranges of the call data conditions shown at the right position in FIG. 7 corresponds to the graph containing the voice call data conditions shown in FIG. 6, and when the mark 43 exists within a range of the square marks in FIG. 7, it is determined that the call data is usable for the search operation.

Although the voice data is subject to search according to each call data independently set up aside from the tone data in the above-mentioned embodiment, the search operation may be effected by designating the range of a practical tone data such as the EG rate.

Although both the tone data and the call data are editable in the RAM in the description above, both or either of the tone data and the call data may be stored in a ROM or a ROM card as preset in the factory.

Furthermore, the name setting operation of the user call data may be effected by inputting an alphabet letter, Japanese "Kana" character, Chinese character, or the like instead of selection on the menu screen.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. An electronic musical instrument having a searching function of a tone color comprising:

tone color data storage means for storing a plurality of tone color data sets each of which includes a plurality of tone color data parameters;

parameter degree storage means for storing a degree of a specified parameter for each tone color;

parameter degree designation means for designating a range of a degree of the specified parameter;

search means for searching the parameter degree storage means to locate any tone colors in which the specified parameter has a degree that is within the range designated by the parameter degree designation means; and musical tone generation means for generating a musical tone according to the tone color data parameters of the tone color corresponding to the located tone colors.

2. An electronic musical instrument according to claim 1, wherein said specified parameter is at least one selected from among data designated as clarity data representing a degree of clarity of a tone, warmth data representing a degree of warmth of the tone, sharpness data representing a degree of sharpness of the tone, heaviness data representing a degree of heaviness of the tone.

3. An electronic musical instrument according to claim 1, wherein said parameters includes a classification code and a voice name.

4. An electronic musical instrument according to claim 1, further comprising display means for displaying graphically the range designated by said parameter degree designation means, and wherein said parameter designation means includes a mouse which moves a cursor on the display means for designating a data input location.

5. An electronic musical instrument capable of reproducing plural musical voices, comprising:

voice memory means for storing plural units of voice data, each of said plural units of voice data corresponding to one of said plural musical voices and including call data and tone color data, said call data representing degrees of one or more voice characteristics and said tone color data for reproducing said corresponding one of said plural musical voices; and search means for searching said call data to determine one of said plural musical voices having a desired tone color, said search means including means for designating a range of a degree of said one or more voice characteristics and means for comparing said call data with said range to determine said call data having a degree which is included in said range.

6. The electronic musical instrument of claim 5 further comprising means for reproducing said corresponding one of said plural musical voices having said desired tone color data according to said call data having said degree which is included in said range.

7. The electronic musical instrument of claim 5 wherein said voice memory means comprises a read-only memory.

8. The electronic musical instrument of claim 5 wherein said voice memory means comprises a random-access memory.

9. The electronic musical instrument of claim 5 wherein said voice memory means comprises an external memory.

10. The electronic musical instrument of claim 6 further comprising a panel control for controlling the operation of the electronic musical instrument.

11. The electronic musical instrument of claim 10 wherein said panel control comprises a ten-key pad, one or more function keys, one or more mode keys, and one or more cursor keys.

* * * * *